(12) United States Patent
Huang et al.

(10) Patent No.: US 12,068,827 B2
(45) Date of Patent: Aug. 20, 2024

(54) CODEBOOK INFORMATION PROCESSING METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Yingpei Huang, Guangdong (CN); Wenhong Chen, Guangdong (CN); Zhihua Shi, Guangdong (CN); Yun Fang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 399 days.

(21) Appl. No.: 17/395,866

(22) Filed: Aug. 6, 2021

(65) Prior Publication Data
US 2021/0367656 A1  Nov. 25, 2021

Related U.S. Application Data

(63) Continuation of application No. PCT/CN2019/075301, filed on Feb. 15, 2019.

(51) Int. Cl.
*H04B 7/06* (2006.01)
(52) U.S. Cl.
CPC ......... *H04B 7/0639* (2013.01); *H04B 7/0626* (2013.01); *H04B 7/0628* (2013.01)
(58) Field of Classification Search
CPC .. H04B 7/0619; H04B 7/0621; H04B 7/0626; H04B 7/0628; H04B 7/0639
See application file for complete search history.

(56) References Cited

U.S. PATENT DOCUMENTS

| | | | |
|---|---|---|---|
| 9,281,881 B2 | 3/2016 | Onggosanusi et al. | |
| 9,319,121 B2 | 4/2016 | Onggosanusi et al. | |

(Continued)

FOREIGN PATENT DOCUMENTS

| | | | |
|---|---|---|---|
| CA | 3053235 A1 * | 8/2018 | ............ H01M 8/026 |
| CN | 102082639 A | 6/2011 | |

(Continued)

OTHER PUBLICATIONS

Ad-Hoc Chair (SAMSUNG): "Chairman's notes of AI 7.2.8 Enhancements on MIMO for NR", 3GPP Draft; R1-1901421 ENR-MIMO, vol. RAN WG1, no. Taipei, Taiwan; Jan. 21, 2019-Jan. 25, 2019 Jan. 25, 2019(Jan. 25, 2019), XP051601334. 9 pages.

(Continued)

*Primary Examiner* — Kevin D Mew
(74) *Attorney, Agent, or Firm* — Perkins Coie LLP

(57) ABSTRACT

A codebook information processing method includes that: a reporting parameter is determined respectively for each of at least one terminal device, different terminal devices corresponding to different reporting parameters, the same terminal device corresponding to different reporting parameters under different conditions, and the reporting parameter including at least one of following information: the number of spatial bases, the number of frequency bases, and a maximum number of non-zero elements; and the reporting parameter respectively for each of the at least one terminal device is configured to different respectively.

18 Claims, 3 Drawing Sheets

A reporting parameter is determined for each of at least one terminal device respectively — 21

The reporting parameter respectively for each of the at least one terminal device is configured and allocated to a corresponding terminal device respectively — 22

(56) References Cited

U.S. PATENT DOCUMENTS

| | | | |
|---|---|---|---|
| 9,425,871 B2 | 8/2016 | Onggosanusi et al. | |
| 9,780,850 B2 | 10/2017 | Onggosanusi et al. | |
| 10,110,286 B2 | 10/2018 | Onggosanusi et al. | |
| 10,361,760 B2 | 7/2019 | Onggosanusi et al. | |
| 2013/0039349 A1* | 2/2013 | Ebrahimi Tazeh Mahalleh | H04L 5/0048 370/336 |
| 2013/0083681 A1* | 4/2013 | Ebrahimi Tazeh Mahalleh | H04B 7/0626 370/252 |
| 2013/0156009 A1* | 6/2013 | Dinan | H04W 72/046 370/332 |
| 2013/0258874 A1* | 10/2013 | Khoshnevis | H04L 5/0064 370/252 |
| 2014/0010126 A1* | 1/2014 | Sayana | H04J 3/1694 370/336 |
| 2014/0226702 A1 | 8/2014 | Onggosanusi et al. | |
| 2015/0288499 A1* | 10/2015 | Nam | H04B 7/0647 370/329 |
| 2016/0013845 A1 | 1/2016 | Onggosanusi et al. | |
| 2016/0182133 A1 | 6/2016 | Onggosanusi et al. | |
| 2016/0254848 A1 | 9/2016 | Onggosanusi et al. | |
| 2016/0294454 A1 | 10/2016 | Onggosanusi et al. | |
| 2017/0141831 A1* | 5/2017 | Rico Alvarino | H04B 7/0639 |
| 2017/0373733 A1 | 12/2017 | Onggosanusi et al. | |
| 2018/0062724 A1* | 3/2018 | Onggosanusi | H04B 7/0421 |
| 2018/0302140 A1* | 10/2018 | Rahman | H04B 7/0626 |
| 2018/0302143 A1 | 10/2018 | Yang et al. | |
| 2018/0309490 A1* | 10/2018 | Rahman | H04B 7/0478 |
| 2019/0123794 A1* | 4/2019 | Onggosanusi | H04B 7/065 |
| 2019/0319758 A1* | 10/2019 | Yum | H04L 5/0051 |
| 2020/0137607 A1* | 4/2020 | Akkarakaran | H04W 72/044 |
| 2021/0028823 A1* | 1/2021 | Park | H04W 8/24 |

FOREIGN PATENT DOCUMENTS

| | | | | |
|---|---|---|---|---|
| CN | 106911369 A | 6/2017 | | |
| CN | 107431515 A | 12/2017 | | |
| CN | 108574521 A | 9/2018 | | |
| CN | 108683487 A | 10/2018 | | |
| WO | WO-2017168396 A1 | * | 10/2017 | ........... H04B 7/0617 |
| WO | WO-2019093934 A1 | * | 5/2019 | ........... H04L 1/1812 |
| WO | WO-2020144188 A1 | * | 7/2020 | ........... H04B 7/0626 |

OTHER PUBLICATIONS

ERICSSON: "On CSI enhancements for MU-MIMO", 3GPP Draft; R1-1900757, vol. RAN WG1, no. Taipei, Taiwan; Jan. 21, 2019-Jan. 25, 2019 Jan. 20, 2019(Jan. 20, 2019), XP051593604. 12 pages.

Huawei et al: "Discussion on CSI enhancement", 3GPP Draft; R1-1900016, vol. RAN WG1, no. Taipei; Jan. 21, 2019-Jan. 25, 2019 Jan. 20, 2019(Jan. 20, 2019), XP051592943. 14 pages.

SAMSUNG: "CSI enhancement for MU-MIMO", 3GPP Draft; R1-1901276, vol. RAN WG1, no. Taipei, Taiwan; Jan. 21, 2019-Jan. 25, 2019 Jan. 17, 2019 (Jan. 17, 2019), XP051601222. 10 pages.

Supplementary European Search Report in the European application No. 19915460.0, mailed on Jan. 12, 2022. 10 pages.

Written Opinion of the International Search Authority in the international application No. PCT/CN2019/075301, mailed on Nov. 8, 2019. 9 pages with English translation.

First Office Action of the European application No. 19915460.0, issued on Oct. 18, 2022. 8 pages.

3Gpp TSG-RAN1 #59 R1-094945, Jeju, Korea, Nov. 9-Nov. 14, 2009, Agenda Item: 7.6.2, Source: Fujitsu, Title: UL-MIMO Enhancement with Codebook Size Adaptation and Nested Codebook Group, Document for: Information and Discussion.

Second Office Action of the European application No. 19915460.0, issued on Mar. 24, 2023.

International Search Report in the international application No. PCT/CN2019/075301, mailed on Nov. 8, 2019.

First Office Action of the Chinese application No. 202111195989.2, issued on Jun. 6, 2022. 17 pages with English Translation.

\* cited by examiner

CODEBOOK INFORMATION PROCESSING METHOD, TERMINAL DEVICE AND NETWORK DEVICE

CROSS-REFERENCE TO RELATED APPLICATION

This is a continuation application of International Patent Application No. PCT/CN2019/075301 filed on Feb. 15, 2019, the content of which is incorporated herein by reference in its entirety.

TECHNICAL FIELD

The disclosure relates to the technical field of information processing, and particularly to a codebook information processing method, a terminal device, a network device, a computer storage medium, a chip, a computer-readable storage medium, a computer program product, and a computer program.

BACKGROUND

For a codebook of each layer, independent coding is used for an existing New Radio (NR) type II codebook in frequency domain (FD) (each sub-band). A Release 16 (R16) NR type II codebook may be represented as:

$$W = W_1 \hat{W}_2 W_f^H.$$

$W_1$ indicates 2L spatial bases, $W_f^H$ indicates M discrete fourier transformation (DFT) bases, and $\hat{W}_2$ (2L*M) indicates a weighting coefficient of any pair of a spatial basis and a frequency-domain DFT basis.

Channel state information CSI) reported by a terminal device includes L spatial beams indicated by $W_1$, M DFT bases indicated by $W_f^H$, and quantized $\hat{W}_2$. A network device may obtain downlink CSI of each layer through a product of the three.

However, in related art, it is inappropriate to directly extend an existing rank½ codebook to a higher rank without restrictions under a higher-order Multiple-Input Multiple-Output (MIMO) condition. In terms of performance, it is not enough to unify channel information reporting accuracies of all terminals through a set of parameters.

SUMMARY

For solving the foregoing technical problem, embodiments of the disclosure provide a codebook information processing method, a terminal device, a network device, a computer storage medium, a chip, a computer-readable storage medium, a computer program product, and a computer program.

A first aspect provides a method for processing codebook information, which may be applied to a network device and include the following operations.

A reporting parameter is determined respectively for each of at least one terminal device, different terminal devices corresponding to different reporting parameters, a same terminal device corresponding to different reporting parameters under different conditions, and the reporting parameter including at least one of following information: the number of spatial bases, the number of frequency bases, and a maximum number of non-zero elements. The reporting parameter respectively for each of the at least one terminal device is configured and allocated to a corresponding terminal device respectively.

A second aspect provides a method for processing codebook information, which may be applied to a terminal device and include the following operations.

A reporting parameter configured by a network device is received, the reporting parameter being configured in a manner that different terminal devices may correspond to different reporting parameters, the terminal device corresponding to different reporting parameters under different conditions, and the reporting parameter including at least one of following information: the number of spatial bases, the number of frequency bases, and a maximum number of non-zero elements.

A third aspect provides a network device, which may include a first processing unit and a first communication unit.

The first processing unit may determine a reporting parameter respectively for each of at least one terminal device, different terminal devices corresponding to different reporting parameters, a same terminal device corresponding to different reporting parameters under different conditions, and the reporting parameter including at least one of following information: the number of spatial bases, the number of frequency bases, and a maximum number of non-zero elements. The first communication unit may configure the reporting parameter respectively for each of the at least one terminal device and allocate the reporting parameter to a corresponding terminal device respectively.

A fourth aspect provides a terminal device, which may include a second communication unit.

The second communication unit may receive a reporting parameter configured by a network device, the reporting parameter being configured in a manner that different terminal devices correspond to different reporting parameters, the terminal device corresponding to different reporting parameters under different conditions, and the reporting parameter including at least one of following information: the number of spatial bases, the number of frequency bases, and a maximum number of non-zero elements.

A fifth aspect provides a network device, which may include a processor and a memory. The memory may be configured to store a computer program. The processor may be configured to call and run the computer program stored in the memory to execute the method in the first aspect or each implementation mode thereof.

A sixth aspect provides a terminal device, which may include a processor and a memory. The memory may be configured to store a computer program. The processor may be configured to call and run the computer program stored in the memory to execute the method in the second aspect or each implementation mode thereof.

A seventh aspect provides a chip, which may be configured to implement the method in any one of the first aspect and the second aspect or each implementation mode thereof.

Specifically, the chip may include a processor configured to call from a memory and run a computer program to cause a device installed with the chip to execute the method in any one of the first aspect and the second aspect or each implementation mode thereof.

An eighth aspect provides a computer-readable storage medium, which may be configured to store a computer program, the computer program causing a computer to execute the method in any one of the first aspect and the second aspect or each implementation mode thereof.

A ninth aspect provides a computer program product, which may include a computer program instruction, the computer program instruction causing a computer to execute the method in any one of the first aspect and the second aspect or each implementation mode thereof.

A tenth aspect provides a computer program, which may run in a computer to cause the computer to execute the method in any one of the first aspect and the second aspect or each implementation mode thereof.

With adoption of the solutions, a corresponding parameter may be configured for a terminal device based on related information of the terminal device, and furthermore, the terminal device may determine and send, to a network device, channel information of at least one layer. The related information may include information of the at least one layer. In such a manner, a codebook may be extended to a higher rank based on a condition of the terminal device, and moreover, different terminal devices may correspond to different indication information, so that the accuracy of channel information determined by different terminal devices based on their own conditions is improved. Moreover, related information of different terminal devices is combined, so that a terminal device without a corresponding capability can be avoided from corresponding to a higher-rank reporting parameter, and the robustness and easiness for implementation of a system are improved.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5th-Generation (5G) system.

Figure 1:
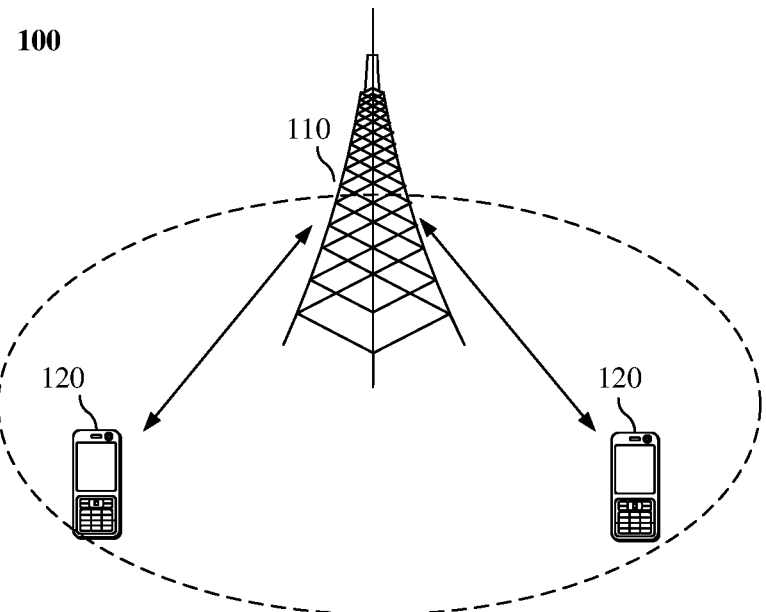
FIG. 1 is a first schematic diagram of an architecture of a communication system according to an embodiment of the disclosure.

In an example, a communication system 100 that the embodiments of the disclosure are applied to may be as shown in FIG. 1. The communication system 100 may include a network device 110, and the network device 110 may be a device communicating with a terminal device 120 (or called a communication terminal or a terminal). The network device 110 may provide a communication coverage for a specific geographical region and may communicate with a terminal device located in the coverage. Optionally, the network device 110 may be a Base Transceiver Station (BTS) in a GSM or the CDMA system, or may also be a NodeB (NB) in a WCDMA system, or may further be an Evolutional Node B (eNB or eNodeB) in an LTE system or a wireless controller in a Cloud Radio Access Network (CRAN). Or the network device may be a mobile switching center, a relay station, an access point, a vehicle device, a wearable device, a hub, a switch, a network bridge, a router, a network-side device in a future 5G network, a network device in a future evolved Public Land Mobile Network (PLMN), etc.

The communication system 100 further includes at least one terminal device 120 within the coverage of the network device 110. The "terminal device" used herein includes, but not limited to, a device arranged to receive/send a communication signal through a wired line connection, for example, through Public Switched Telephone Network (PSTN), Digital Subscriber Line (DSL), digital cable and direct cable connections, and/or another data connection/network) and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another communication terminal device, and/or an Internet of Things (IoT) device. The terminal device configured to communicate through a wireless interface may be called a "wireless communication terminal", a "wireless terminal" or a "mobile terminal device." Examples of the mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal device, User Equipment (UE), a user unit, a user station, a mobile station, a mobile radio station, a remote station, a remote terminal device, a mobile device, a user terminal device, a terminal device, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN, etc.

It should be understood that terms "system" and "network" in the disclosure may usually be interchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

Embodiment 1

Figure 2:
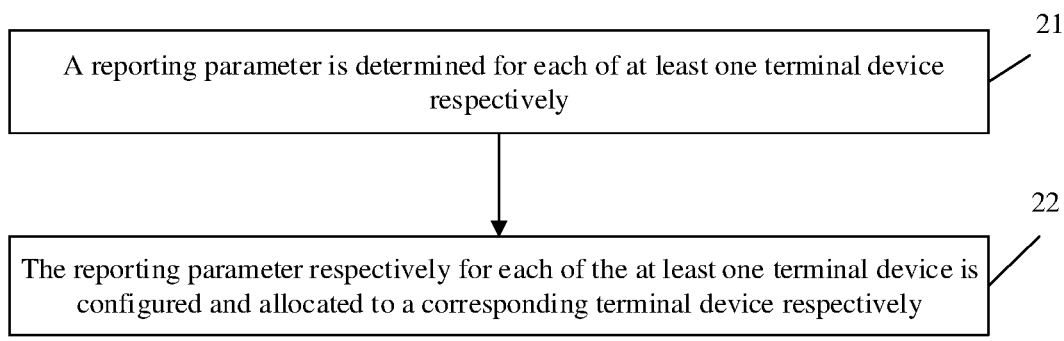
FIG. 2 is a first flowchart of a codebook information processing method according to an embodiment of the disclosure.

The embodiment of the disclosure provides a codebook information processing method, which is applied to a network device and, as shown in FIG. 2, includes the following operations.

In operation 21, a reporting parameter is determined for each of at least one terminal device respectively, different terminal devices corresponding to different reporting parameters, a same terminal device corresponding to different reporting parameters under different conditions, and the reporting parameter including at least one of following information: the number of spatial bases, the number of frequency bases, and a maximum number of non-zero elements.

In operation 22, the reporting parameter respectively for each of the at least one terminal device is configured and allocated to a corresponding terminal device respectively.

It is to be pointed out that a reporting parameter may be determined for a terminal device in the embodiment. Different terminal devices may have different capabilities, and thus different terminal devices may correspond to different reporting parameters. Furthermore, a same terminal device may correspond to a same reporting parameter under a same condition, or may correspond to different reporting parameters under different conditions. Specific descriptions will be made below.

Before the operation 21 is executed, namely before the operation that the reporting parameter is determined for each of the at least one terminal device respectively, the method may further include that different UE capability information sent by the at least one terminal device is received.

Correspondingly, different reporting parameters may be determined for different terminal devices based on the different UE capability information.

The UE capability information may be determined using different parameters. For example, different UE capability information may be determined based on different latency, different Quality of Service (QoS), and processing capabilities and processing resources of the terminal devices.

The network device may classify the capability information of the terminal device in advance. For example, after terminal devices are divided into multiple types, different reporting parameters may be determined for different types of terminal devices.

The condition includes a rank index, and/or, a CSI measurement bandwidth.

That is, different reporting parameters may be allocated to a same terminal device with different rank indexes and/or different CSI measurement bandwidths. The same terminal device may correspond to different rank indexes under different conditions, and may also correspond to different CSI measurement bandwidths according to a practical condition.

Furthermore, different reporting parameters may be determined for the terminal device based on different rank indexes and/or different CSI measurement bandwidths of the terminal device. Different rank indexes may correspond to different reporting parameters, and moreover, reporting parameters corresponding to different layers may be determined based on the rank indexes. In addition, there may be a bandwidth threshold, and different reporting parameters may be determined based on comparison between CSI measurement bandwidths and the bandwidth threshold.

The reporting parameter may include at least one of following information:
  the number of spatial bases corresponding to each layer;
  the number of spatial bases corresponding to a rank index;
  the number of spatial bases corresponding to a CSI measurement bandwidth reported by a terminal device;
  the number of spatial bases corresponding to a capability of the terminal device;
  at least one parameter for determining the number of frequency-domain bases corresponding to each layer;
  at least one parameter for determining the number of frequency-domain bases corresponding to a rank index;
  at least one parameter for determining a maximum number of non-zero elements corresponding to each layer; and
  at least one parameter for determining a maximum number of non-zero elements corresponding to a rank index.

The reporting parameter may further include at least one of following information:
  an amplitude quantization accuracy and/or phase quantization accuracy corresponding to each layer;
  an amplitude quantization accuracy and/or phase quantization accuracy corresponding to a rank index;
  an amplitude quantization accuracy and/or phase quantization accuracy corresponding to a CSI measurement bandwidth of the terminal device; or
  an amplitude quantization accuracy and/or phase quantization accuracy corresponding to the capability of the terminal device.

Each layer is each rank.

Specifically, according to the solution provided in the embodiment, related parameters of multiple groups of terminal devices may be defined, and indication information may be sent to the terminal devices based on at least one of following parameters: different capabilities, different rank indexes, different layers, and different reporting bandwidths, the indication information including at least one type of information, so that the terminal devices can determine corresponding parameters based on the indication information to report channel information.

The reporting parameter may include at least one of following information:
  the number L of spatial bases;
  the number M of frequency bases;
  a maximum number K0 of reported elements;
  the amplitude quantization accuracy;
  the phase quantization accuracy;

the number of different accuracies for amplitude quantization; and the number of accuracies for phase quantization.

One or more reporting parameters in the above reporting parameters may be combined.

The solution will be described below in detail through multiple scenarios.

A first scenario: a reporting parameter is determined based on a rank index of a terminal device, and the terminal calculates a Rank Indicator (RI).

The reporting parameter is determined based on different rank indexes and/or a higher-layer indication.

$W = W_1 \hat{W}_2 W_f^H$ of each layer is calculated. For at least one layer of the same terminal device, a same configuration, for example, a present design such as rank=2, may be used, and of course, different configurations may also be used.

Specifically, for different layers, same or different L may be configured according to the indication information of the network device.

For different layers, same or different M may be obtained according to at least one parameter in the indication information. The at least one parameter may be N3, different p, and/or different R.

Specifically, a manner for calculating an M value of each layer is, for example:

$$M_i = \left\lceil p_i \times \frac{N_3}{R_i} \right\rceil \text{ or } M_i = \lceil p_i \times N_3 \rceil.$$

Herein, i represents different layers of the terminal device. For example, when the terminal device has two layers, i is 1 and 2 respectively, namely M values of layer 1 and layer 2 are calculated respectively.

For different layers, the same or different K0 may be obtained according to the configuration. A calculation manner may be:

$K_{0,i} = \lceil \beta_i \times 2L_i M_i \rceil$, where i corresponds to different layers.

Furthermore, same or different amplitude and phase quantization accuracies may be used for different layers according to the indication information.

Coded channel information of at least one layer for codebook calculation may be determined based on the at least one reporting parameter, and the coded channel information of the at least one layer for codebook calculation may be sent to the network device.

That is, the terminal device may encode and report W of each layer in a preset order, and a network side may obtain channel information of each layer in the preset order. The preset order may be from higher layers to lower layers, or from the lower layers to the higher layers.

For reporting of $\hat{W}_2$, the network device may configure an L value, i.e., the number of spatial bases.

An M value (related to a reported frequency-domain bandwidth), i.e., the number of reported frequency bases, may be used, which is configured by a higher layer. N3 is the number of candidate frequency bases. R may be 1 or 2, and is a parameter configured by a higher layer.

A K0 value is used to restrict the maximum number of the reported elements in $\hat{W}_2$, and may be also configured by a higher layer.

The number of non-zero elements in $\hat{W}_2$ and/or positions in $\hat{W}_2$ may be determined through a bitmap and/or an indication.

The quantization accuracy in $\hat{W}_2$ may be determined through one or more sets of (amplitude, phase) parameters.

For example, ¾ bit may be used for amplitude quantization, and ¾ bit may be used for phase quantization.

For part of elements (for example, first 50%) corresponding to a higher amplitude, 4 bit may be used for amplitude quantization, and 3 bit may be used for phase quantization. For a part corresponding to a lower amplitude, 2 bit may be used for amplitude quantization, and 2 bit may be used for phase quantization.

For a 0th frequency basis, (4, 4)bit may be used for (amplitude, phase) quantization. For another frequency basis, (3, 3)bit may be used for (amplitude, phase) quantization.

Physical meanings of the parameters are as follows:

L indicates the column number of W1, the column number of W1 is 2L in practice, two polarization directions correspond to the same Space Domain (SD) basis, and channel information of L SD bases is fed back through a codebook;

M indicates the column number of $W_f^H$, the M columns are selected from totally N3 FD bases, and channel information of the M FD bases are fed back through a codebook; and K0 indicates the maximum number of the non-zero elements in $\hat{W}_2$, and an (i,j)th element in $\hat{W}_2$ describes a weighting coefficient of an ith SD basis and a jth FD basis. (K0 is the maximum number of the non-zero elements, and the number of practically reported non-zero elements may be less than K0).

Examples under the first scenario are as follows.

Example 1-1: L configurations for different rank indexes may be from different parameter sets, for example, as shown in the following table:

| Layer index | L |
|---|---|
| 0 | {2, 4, 6} |
| 1 | {2, 4, 6} |
| 2 | {2, 3, 4} |
| 3 | {2, 3, 4} |

When the terminal device reports layer 1 and layer 2, network can only select a value from a parameter set {2,4,6} to configure the terminal device.

When the terminal device reports layer 3 and layer 4, network can only select a value from a parameter set {2,3,4} to configure the terminal device.

The reporting parameter respectively for each of the at least one terminal device may be explicitly or implicitly configured to different terminal devices respectively. When different L values are indicated implicitly, a higher-layer indication may be used for configuration (an indication range is 0,1,2), as shown in the following table, namely any one of 0, 1, and 2 may be included when implicit indication is adopted. Furthermore, the terminal device may determine a specific L value indicated by the network device according to the numerical value that is implicitly indicated.

| L | | Higher-layer indication | | |
|---|---|---|---|---|
| Layer index | L parameter set | 0 | 1 | 2 |
| 0 | {2, 4, 6} | 2 | 4 | 6 |
| 1 | {2, 4, 6} | 2 | 4 | 6 |
| 2 | {2, 3, 4} | 2 | 3 | 4 |
| 3 | {2, 3, 4} | 2 | 3 | 4 |

Example 1-2: p configurations for different layers may be from different parameter sets, for example, as shown in the following table:

| Layer index | P |
|---|---|
| 0 | {3/4, 1/2} |
| 1 | {3/4, 1/2} |
| 2 | {1/2, 1/4} |
| 3 | {1/2, 1/4} |

When the terminal device reports layer 1 and layer 2, the network device can only select a value from a parameter set {3/4,1/2} to configure the terminal device. When the terminal device reports layer 3 and layer 4, network can only select a value from a parameter set {1/2,1/4} to configure the terminal device. When different p values are implicitly indicated, a higher-layer indication may be used for configuration (an indication range is 0,1,2), as shown in the following table:

| | p | Higher-layer indication | |
|---|---|---|---|
| Layer index | p parameter set | 0 | 1 |
| 0 | {3/4, 1/2} | 3/4 | 1/2 |
| 1 | {3/4, 1/2} | 3/4 | 1/2 |
| 2 | {1/2, 1/4} | 1/2 | 1/4 |
| 3 | {1/2, 1/4} | 1/2 | 1/4 |

A second scenario: the reporting parameter is determined according to the rank index of the terminal device, and the terminal device calculates the RI.

It is to be understood that the first and second scenarios may be combined for use.

Different reporting parameters may be determined for different rank indexes and/or a higher-layer indication.

$W=W_1 \hat{W}_2 W_f^H$ of each layer is calculated based on indication information.

For different rank indexes, same or different L may be obtained according to the configuration.

For different rank indexes, same or different M may be obtained. Different M may be determined by N3 and different p and/or R in the indication information. For example:

$$M_i = \left\lfloor p_i \times \frac{N_3}{R_i} \right\rfloor \text{ or } M_i = \lceil p_i \times N_3 \rceil.$$

Herein, i corresponds to different rank indexes.

For different layers, same or different K0 may be obtained according to the configuration.

$K_{0,i} = \lceil \beta_i \times 2 L_i M_i \rceil.$

Herein, i corresponds to different rank indexes.

For different rank indexes, same or different amplitude and phase quantization accuracies may be used according to the configuration.

The abovementioned similar calculations may be combined to finally acquire at least one of values.

The terminal device may encode and report W of each layer in a preset order, and the network side may obtain channel information of each layer in the preset order.

Example 2-1 is taken here.

L configurations for different rank indexes may be from different parameter sets, for example, as shown in the following table:

| Rank index | L |
|---|---|
| 0 | {2, 3, 4} |
| 1 | {2, 3, 4} |
| 2 | {2, 4, 6} |
| 3 | {2, 4, 6} |

When the terminal device reports layers 1 and 2, network can only select a value from the parameter set {2,3,4} to configure the terminal device. When the terminal device reports layers 3 and 4, network can only select a value from the parameter set {2,4,6} to configure the terminal device.

It is to be pointed out that the indication information may indicate the terminal device explicitly or implicitly. For example, in case of different L values, a higher-layer indication may be used for configuration (an indication range is 0,1,2), as shown in the following table:

| | L | Higher-layer indication | | |
|---|---|---|---|---|
| Rank index | L parameter set | 0 | 1 | 2 |
| 1 | {2, 3, 4} | 2 | 3 | 4 |
| 2 | {2, 3, 4} | 2 | 3 | 4 |
| 3 | {2, 4, 6} | 2 | 4 | 6 |
| 4 | {2, 4, 6} | 2 | 4 | 6 |

Example 2-2: the first and second scenarios may be combined. An example is as follows: L configurations for different layers and different layer indexes may be from different parameter sets, for example, as shown in the following table.

| Rank index | Layer index | L |
|---|---|---|
| 1 | 0 | {2, 3, 4} |
| 2 | 0 | {2, 3, 4} |
| 2 | 1 | {2, 3, 6} |
| 3 | 0 | {2, 4, 6} |
| 3 | 1 | {2, 3, 4} |
| 3 | 2 | {2, 3, 4} |
| 4 | 0 | {2, 4, 6} |
| 4 | 1 | {2, 4, 6} |
| 4 | 2 | {2, 3, 4} |
| 4 | 3 | {2, 3, 4} |

Example 2-3: M configurations for different rank indexes may be from different parameter sets, for example, as shown in the following table (M is determined by p configured by a higher layer). In the embodiment, performance is firstly considered, namely, more feedbacks are given if the layer rank is larger. Similarly, overhead may also be set preferably, namely a value range of p is smaller if the layer rank is lower, as shown in the following table:

| Rank index | P |
|---|---|
| 0 | {1/2, 1/4} |
| 1 | {1/2, 1/4} |
| 2 | {3/4, 1/2} |
| 3 | {3/4, 1/2} |

When the terminal device reports layers 1 and 2, network can only select a value from the parameter set {1/2,1/4} to configure the terminal device. When the terminal device reports layers 3 and 4, network can only select a value from the parameter set {3/4,1/2} to configure the terminal device.

When different p values are implicitly indicated, a higher-layer indication may be used for configuration (an indication range is 0,1,2), for example, as shown in the following table:

| Rank index | p | | Higher-layer indication | |
| --- | --- | --- | --- | --- |
| | p parameter set | | 0 | 1 |
| 1 | {1/2, 1/4} | | 1/2 | 1/4 |
| 2 | {1/2, 1/4} | | 1/2 | 1/4 |
| 3 | {3/4, 1/2} | | 3/4 | 1/2 |
| 4 | {3/4, 1/2} | | 3/4 | 1/2 |

Or, p configurations for different rank indexes and different layers may be from different parameter sets, for example, as shown in the following table:

| Rank index | Layer index | p |
| --- | --- | --- |
| 1 | 0 | {3/4, 1/2} |
| 2 | 0 | {3/4, 1/2} |
| 2 | 1 | {3/4, 1/2} |
| 3 | 0 | {3/4, 1/2} |
| 3 | 1 | {1/2, 1/4} |
| 3 | 2 | {1/2, 1/4} |
| 4 | 0 | {3/4, 1/2} |
| 4 | 1 | {3/4, 1/2} |
| 4 | 2 | {1/2, 1/4} |
| 4 | 3 | {1/2, 1/4} |

Example 2-4: a higher-layer configured beta value for the control parameter K0 may also be determined for different rank indexes and/or layer indexes and/or terminal capabilities. Referring to the following table, UE capability is described for illustration. Processing implemented in combination with other parameters will not be elaborated herein.

| UE capability | Beta |
| --- | --- |
| 0 | {3/4, 1/2} |
| 1 | {1/4, 1/8} |

A third scenario: the reporting parameter is determined by a CSI measurement bandwidth reported by the terminal device.

At first, the terminal device reports its own CSI measurement bandwidth to the network device. The network device determines corresponding indication information according to the capability of the terminal device. Furthermore, the terminal device determines the reporting parameter according to the indication information.

$W = W_1 \hat{W}_2 W_f^H$ of each layer is calculated.

For different reported CSI measurement bandwidths, same or different L may be obtained according to the configuration.

For different reported CSI measurement bandwidths, same or different M may be obtained according to the configuration. Different M may be determined by N3 and different p and/or R. For example:

$$M_i = \left\lceil p_i \times \frac{N_3}{R} \right\rceil \text{ or } M_i = \lceil p_i \times N_3 \rceil.$$

Herein, i corresponds to different reported CSI measurement bandwidths, namely i=0 when N3/R<T, and i=1 when N3/R>=T (or i=0 when N3<T, and i=1 when N3>=T).

For different reported CSI measurement bandwidths, same or different K0 may be obtained according to the configuration.

$$K_{0,i} = \lceil \beta_i \times 2 L_i M_i \rceil.$$

Herein, i corresponds to different reported CSI measurement bandwidths, namely i=0 when N3/R<T, and i=1 when N3/R>=T (or i=0 when N3<T, and i=1 when N3>=T).

For different reported CSI measurement bandwidths, same or different amplitude and phase quantization accuracies may be used according to the configuration.

The terminal device may encode and report W of each layer in a preset order, and the network side may obtain channel information of each layer in the preset order.

Example 3-1: L configurations for different bandwidths may be from different parameter sets, for example, as shown in the following table:

| Bandwidth | L |
| --- | --- |
| 0 | {2, 3, 4} |
| 1 | {2, 4, 6} |

When a reporting bandwidth of the terminal device is less than a threshold (for example, N3/R<=T, e.g. T is 13 Physical Resource Blocks (PRBs)), network may select a value from the parameter set {2,3,4} to configure the terminal device.

When a reporting bandwidth of the terminal device is greater than the threshold (for example, N3/R>T), network may select a value from the parameter set {2,4,6} to configure the terminal device.

When different L values are indicated implicitly, a higher-layer indication may be used for configuration (an indication range is 0,1,2), referring to the following table:

| | | L | Higher-layer indication | |
| --- | --- | --- | --- | --- |
| Bandwidth | L parameter set | 0 | 1 | 2 |
| 0 | {2, 3, 4} | 2 | 3 | 4 |
| 1 | {2, 4, 6} | 2 | 4 | 6 |

Similarly, all the parameters L and/or M(p) and/or K0 (beta) may be distinguished by bandwidth, and exhaustions are omitted herein.

A fourth scenario: the reporting parameter is determined by the UE capability.

The reporting parameter is determined according to a UE capability indication.

$W = W_1 \hat{W}_2 W_f^H$ of each layer is calculated.

For different UE capability indications, same or different L may be obtained according to the configuration.

For different UE capability indications, same or different M may be obtained according to the configuration. Different M may be determined by N3 and different p and/or R. For example:

$$M_i = \left\lceil p_i \times \frac{N_3}{R_i} \right\rceil \text{ or } M_i = \lceil p_i \times N_3 \rceil.$$

Herein, i corresponds to different UE capability indications.

For different layers, same or different K0 may be obtained according to the configuration.

$$K_{0,i} = \lceil \beta_i \times 2 L_i M_i \rceil.$$

Herein, i corresponds to different UE capability indications.

For different UE capability indications, same or different amplitude and phase quantization accuracies may be used according to the configuration.

The abovementioned calculations may be freely combined.

The terminal may encode and report W of each layer in a preset order, and the network side may obtain channel information of each layer in the preset order.

Example 4-1: the parameter L is determined by different UE capabilities. For example, a corresponding relationship between a UE capability and a corresponding parameter set is as follows.

| UE capability | L |
|---|---|
| 0 | {2, 3, 4} |
| 1 | {2, 4, 6} |

The terminal device may report a UE capability when accessing network, and the network can only select a parameter value from a corresponding parameter set for configuring the terminal device after receiving the UE capability information of the terminal device.

Example 4-2

The parameter p is determined by different UE capabilities. For example, a corresponding relationship between a UE capability and a corresponding parameter set is shown in the following table:

| UE capability | P |
|---|---|
| 0 | {3/4, 1/2} |
| 1 | {1/2, 1/4} |

The terminal device may report a UE capability when accessing network, and the network can only select a parameter value from a corresponding parameter set for configuring the terminal device after receiving the UE capability information of the terminal device.

It can be seen that, with adoption of the above solutions, a corresponding parameter may be configured for the terminal device according to related information of the terminal device, and furthermore, the terminal device may determine and send, to the network device, channel information of at least one layer. The related information may include information of at least one layer. In such a manner, a codebook may be extended to a higher layer based on a situation of the terminal device, and moreover, different terminal devices may correspond to different indication information, so that the accuracy of channel information determined by different terminal devices based on their own situations is improved. Moreover, related information of different terminal devices is combined, so that the condition that a terminal device without a corresponding capability corresponds to a higher-rank reporting parameter may be avoided, and the robustness and easiness for implementation of a system are improved.

Embodiment 2

Figure 3:
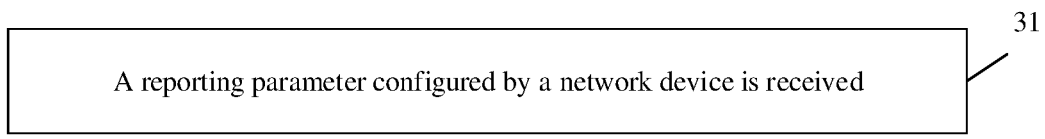
FIG. 3 is a second flowchart of a codebook information processing method according to an embodiment of the disclosure.

The embodiment of the disclosure provides a codebook information processing method, which is applied to a terminal device and, as shown in FIG. 3, includes the following operation.

In operation 31, a reporting parameter configured by a network device is received, the reporting parameter being configured in a manner that different terminal devices may correspond to different reporting parameters, the terminal device corresponding to different reporting parameters under different conditions, and the reporting parameter including at least one of following information: the number of spatial bases, the number of frequency bases, and a maximum number of non-zero elements.

The method may further include that:

UE capability information is sent to the network device.

The reporting parameter may include at least one of following information:

the number of spatial bases corresponding to each layer;
the number of spatial bases corresponding to a rank index;
the number of spatial bases corresponding to a CSI measurement bandwidth reported by the terminal device;
the number of spatial bases corresponding to a capability of the terminal device;
at least one parameter for determining the number of frequency-domain bases corresponding to each layer;
at least one parameter for determining the number of frequency-domain bases corresponding to a rank index;
at least one parameter for determining the maximum number of non-zero elements corresponding to each layer; and
at least one parameter for determining the maximum number of non-zero elements corresponding to a rank index.

Specifically, according to the solution provided in the embodiment, related parameters of multiple groups of terminal devices may be defined, and indication information may be sent to the terminal devices based on at least one of different capabilities, different rank indexes, different layers, or different reporting bandwidths. The indication information includes at least one type of information, so that the terminal devices can determine corresponding parameters according to the indication information for channel information reporting.

The reporting parameter may further include at least one of following information:

an amplitude quantization accuracy and/or phase quantization accuracy corresponding to each layer;
an amplitude quantization accuracy and/or phase quantization accuracy corresponding to a rank index;
an amplitude quantization accuracy and/or phase quantization accuracy corresponding to a CSI measurement bandwidth of the terminal device; and
an amplitude quantization accuracy and/or phase quantization accuracy corresponding to a capability of the terminal device.

That is, the reporting parameter may specifically include at least one of following information:

the number L of spatial bases;
the number M of frequency bases;
a maximum number K0 of reported elements;
the amplitude quantization accuracy;
the phase quantization accuracy;
the number of different accuracies for amplitude quantization; and
the number of accuracies for phase quantization.

One or more reporting parameters in the above reporting parameters may be combined.

It is to be understood that at least one parameter in the abovementioned indication information may be determined by the network device according to a layer and/or rank index of the terminal device. The terminal may use different parameters for reporting when rank indexes are different. The use of different parameters has two meanings: one is different parameter sets are used for different layers in the same terminal device, and another is different terminal devices correspond to different rank indexes (RIs), and thus different terminal devices may use different parameter sets.

The reporting parameter may be determined by a bandwidth of the terminal device. For example, the reporting parameter may be determined according to a threshold. For example, when the number of CSI reporting sub-bands of the terminal device is less than a bandwidth threshold, a first parameter is used, otherwise a second parameter is used.

The reporting parameter may be determined by a UE capability. The terminal device may report a capability indication to network, and the network may configure, based on the indication information, the terminal device to use a corresponding parameter. It is to be pointed out that the abovementioned parameter may be one parameter, or a parameter set consisting of multiple parameters.

The method may further include that: channel information of each layer is encoded and reported based on the reporting parameter.

The solution will be described below in detail through multiple scenarios.

A first scenario: the reporting parameter is determined based on a layer of the terminal device for reporting, and the terminal device calculates an RI.

The reporting parameter is determined based on different layers and/or a higher-layer indication.

$W = W_1 \hat{W}_2 W_f^H$ of each layer is calculated. For at least one layer of the terminal device, a same configuration, for example, a present design such as rank=2, may be used, and of course, different configurations may also be used.

Specifically, for different layers, same or different L may be configured according to the indication information of the network device.

For different layers, same or different M may be obtained according to at least one parameter in the indication information. The at least one parameter may be N3, different p, and/or different R.

Specifically, a manner for calculating an M value of each layer is, for example:

$$M_i = \left\lfloor p_i \times \frac{N_3}{R_i} \right\rfloor \text{ or } M_i = \lceil p_i \times N_3 \rceil.$$

Herein, i represents different layers of the terminal device. For example, when the terminal device has two layers, i is 1 and 2 respectively, namely M values of layer 1 and layer 2 are calculated respectively.

For different layers, same or different K0 may be obtained according to the configuration. A calculation manner may be:

$K_{0,i} = \lceil \beta_i \times 2L_i M_i \rceil$, where i corresponds to different layers.

Furthermore, for different layers, same or different amplitude and phase quantization accuracies may be used according to the indication information.

Coded channel information of at least one layer for codebook calculation may be determined based on at least one reporting parameter, and the coded channel information of the at least one layer for codebook calculation may be sent to the network device.

That is, the terminal device may encode and report W of each layer in a preset order, and a network side may obtain channel information of each layer in the preset order. The preset order may be from higher layers to lower layers, or from the lower layers to the higher layers.

For reporting of $\hat{W}_2$, the network device may configure an L value, i.e., the number of the spatial bases. For Release 15 (Rel-15), L is a constant configured by Radio Resource Control (RRC), and a value range is {2,3,4}. For Rel-16 MIMO enhancement under discussion, the value of L is undetermined to be {2,4} or {3,6}.

An M value (related to a reported frequency-domain bandwidth), i.e., the number of reported frequency bases, is used, and is configured by a higher layer. N3 is the number of candidate frequency bases. R is 1 or 2, and is a parameter configured by a higher layer.

A K0 value is used to restrict the maximum number of the reported elements in $\hat{W}_2$, and is also configured by a higher layer.

The number of non-zero elements in $\hat{W}_2$ and/or positions in $\hat{W}_2$ may be determined based on a bitmap and/or an indication.

The quantization accuracy in $\hat{W}_2$ may be determined based on one or more sets of (amplitude, phase) parameters. For example, 3/4 bit is used for amplitude quantization, and 3/4 bit is used for phase quantization.

For part of elements (for example, first 50%) corresponding to a higher amplitude, 4 bit may be used for amplitude quantization, and 3 bit may be used for phase quantization. For a part corresponding to a relatively low amplitude, 2 bit may be used for amplitude quantization, and 2 bit may be used for phase quantization.

For a 0th frequency basis, (4, 4)bit may be used for (amplitude, phase) quantization. For another frequency basis, (3, 3)bit may be used for (amplitude, phase) quantization.

Physical meanings of the parameters are as follows:

L indicates the column number of W1, the column number of W1 is 2L in practice, two polarization directions correspond to the same SD basis, and channel information of L SD bases is fed back through a codebook;

M indicates the column number of $W_f^H$, the M columns are selected from totally N3 FD bases, and channel information of the M FD bases are fed back through a codebook; and K0 indicates the maximum number of the non-zero elements in $\hat{W}_2$, and an (i,j)th element in $\hat{W}_2$ describes a weighting coefficient of an ith SD basis and a jth FD basis. (K0 is the maximum number of the non-zero elements, and the number of practically reported non-zero elements may be less than K0).

A second scenario: the reporting parameter is determined according to an rank index of the terminal device, and the terminal device calculates the RI.

It is to be understood that the first and second scenarios may be combined.

Different reporting parameters may be determined for different rank indexes and/or a higher-layer indication.

$W = W_1 \hat{W}_2 W_f^H$ of each layer is calculated based on indication information.

For different rank indexes, L may be same or different according to the configuration.

For different rank indexes, M may be same or different. Different M may be determined by N3 and different p and/or R in the indication information. For example:

$$M_i = \left\lfloor p_i \times \frac{N_3}{R_i} \right\rfloor \text{ or } M_i = \lceil p_i \times N_3 \rceil$$

Herein, i corresponds to different rank indexes.

For different layers, K0 may be same or different according to the configuration.

$$K_{0,i} = \lceil \beta_i \times 2L_i M_i \rceil$$

Herein, i corresponds to different rank indexes.

For different rank indexes, same or different amplitude and phase quantization accuracies may be used according to the configuration.

Similarly, the abovementioned calculations may be combined to finally acquire at least one of the parameters.

The terminal device may encode and report W of each layer in a preset order, and the network side may obtain channel information of each layer in the preset order.

A third scenario: the reporting parameter is determined by a CSI measurement bandwidth reported by the terminal device.

At first, the terminal device reports its own CSI measurement bandwidth to the network device. The network device determines corresponding indication information according to the capability of the terminal device. Furthermore, the terminal device determines the reporting parameter according to the indication information.

$W = W_1 \hat{W}_2 W_f^H$ of each layer is calculated.

For different reported CSI measurement bandwidths, L may be the same or different according to the configuration.

For different reported CSI measurement bandwidths, M may be the same or different according to the configuration. Different M may be determined by N3 and different p and/or R. For example:

$$M_i = \left\lceil p_i \times \frac{N_3}{R} \right\rceil \text{ or } M_i = \lceil p_i \times N_3 \rceil$$

Herein, i corresponds to different reported CSI measurement bandwidths, namely i=0 when N3/R<T, and i=1 when N3/R>=T (or i=0 when N3<T, and i=1 when N3>=T).

For different reported CSI measurement bandwidths, K0 may be the same or different according to the configuration.

$$K_{0,i} = \lceil \beta_i \times 2L_i M_i \rceil$$

Herein, i corresponds to different reported CSI measurement bandwidths, namely i=0 when N3/R<T, and i=1 when N3/R>=T (or i=0 when N3<T, and i=1 when N3>=T).

For different reported CSI measurement bandwidths, the same or different amplitude and phase quantization accuracies may be used according to the configuration.

The terminal device may encode and report W of each layer in a preset order, and the network side may obtain channel information of each layer in the preset order.

A fourth scenario: the reporting parameter is determined by the UE capability.

The reporting parameter is determined according to a UE capability indication.

$W = W_1 \hat{W}_2 W_f^H$ of each layer is calculated.

For different UE capability indications, L may be the same or different according to the configuration.

For different UE capability indications, M may be the same or different according to the configuration. Different M may be determined by N3 and different p and/or R. For example:

$$M_i = \left\lceil p_i \times \frac{N_3}{R_i} \right\rceil \text{ or } M_i = \lceil p_i \times N_3 \rceil$$

Herein, i corresponds to different UE capability indications.

For different layers, K0 may be the same or different according to the configuration.

$$K_{0,i} = \lceil \beta_i \times 2L_i M_i \rceil$$

Herein, i corresponds to different UE capability indications.

For different UE capability indications, the same or different amplitude and phase quantization accuracies may be used according to the configuration.

The abovementioned calculations may be freely combined.

The terminal may encode and report W of each layer in a preset order, and the network side may obtain channel information of each layer in the preset order.

It can be seen that, with adoption of the solutions, a corresponding parameter may be configured for the terminal device according to related information of the terminal device, and furthermore, the terminal device may determine and send, to the network device, channel information of at least one layer. The related information may include information of at least one layer. In such a manner, a codebook may be extended to a higher rank based on a situation of the terminal device, and moreover, different terminal devices may correspond to different indication information, so that the accuracy of channel information determined by different terminal devices according to their own situations is improved. Moreover, related information of different terminal devices is combined, so that the condition that a terminal device without a corresponding capability corresponds to a higher-rank reporting parameter may be avoided, and the robustness and easiness for implementation of a system are improved.

Embodiment 3

Figure 4:
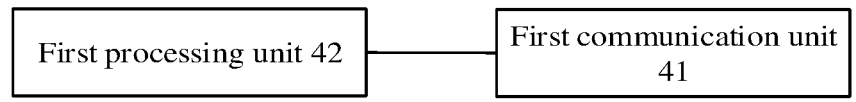
FIG. 4 is a composition structure diagram of a network device according to an embodiment of the disclosure.

The embodiment of the disclosure provides a network device, which, as shown in FIG. 4, includes a first communication unit 41 and a first processing unit 42.

The first communication unit 41 is configured to determine a reporting parameter respectively for each of at least one terminal device, different terminal devices corresponding to different reporting parameters, a same terminal device corresponding to different reporting parameters under different conditions, and the reporting parameter including at least one of following information: the number of spatial bases, the number of frequency bases, or a maximum number of non-zero elements.

The first processing unit 42 is configured to configure the reporting parameter respectively for each of the at least one terminal device and allocate the reporting parameter to corresponding terminal device respectively.

It is to be pointed out that the reporting parameter is determined for the terminal device in the embodiment. Different terminal devices may have different capabilities, and thus different terminal devices may correspond to different reporting parameters. Furthermore, the same terminal device may correspond to the same reporting parameter under the same condition, and may correspond to different reporting parameters under different conditions. Specific descriptions will be made below.

The first communication unit 41 is configured to receive different UE capability information from the at least one terminal device.

Correspondingly, the first processing unit 42 is configured to determine different reporting parameters for different terminal devices based on the different UE capability information.

The UE capability information may be determined using different parameters. For terminal devices, the different UE capability information may be determined using different latency, different QoS, and processing capabilities and processing resources of the terminal devices.

The network device may classify the capability information of the terminal devices in advance. For example, after multiple types of terminal devices are divided, different reporting parameters can be determined for different types of terminal devices.

The condition includes a rank index, and/or, a CSI measurement bandwidth.

That is, different reporting parameters may be allocated to a same terminal device under different rank indexes and/or different CSI measurement bandwidths. The same terminal device may correspond to different rank indexes under different conditions, and may also correspond to different CSI measurement bandwidths according to a practical condition.

Furthermore, the first processing unit 42 is configured to determine different reporting parameters for the terminal device based on different rank indexes and/or different CSI measurement bandwidths of the terminal device. Different rank indexes may correspond to different reporting parameters, and moreover, reporting parameters corresponding to different layers may be determined based on the rank index. In addition, there may be a bandwidth threshold, and different reporting parameters are determined according to comparison between the CSI measurement bandwidths and the bandwidth threshold.

The reporting parameter may include at least one of following information:
  the number of spatial bases corresponding to each layer;
  the number of spatial bases corresponding to a rank index;
  the number of spatial bases corresponding to a CSI measurement bandwidth reported by the terminal device;
  the number of spatial bases corresponding to a capability of the terminal device;
  at least one parameter for determining the number of frequency-domain bases corresponding to each layer;
  at least one parameter for determining the number of frequency-domain bases corresponding to the rank index;
  at least one parameter for determining the maximum number of non-zero elements corresponding to each layer; or
  at least one parameter for determining the maximum number of non-zero elements corresponding to the rank index.

The reporting parameter may further include at least one of following information:
  an amplitude quantization accuracy and/or phase quantization accuracy corresponding to each layer;
  an amplitude quantization accuracy and/or phase quantization accuracy corresponding to a rank index;
  an amplitude quantization accuracy and/or phase quantization accuracy corresponding to a CSI measurement bandwidth of the terminal device; or
  an amplitude quantization accuracy and/or phase quantization accuracy corresponding to a capability of the terminal device.

Specifically, according to the solution provided in the embodiment, related parameters of multiple groups of terminal devices may be defined, and indication information may be sent to the terminal devices based on at least one of different capabilities, different rank indexes, different layers, or different reporting bandwidths, the indication information including at least one type of information, so that the terminal devices can determine corresponding parameters according to the indication information for channel information reporting.

The reporting parameter may include at least one of following information:
  the number L of spatial bases;
  the number M of frequency bases;
  the maximum number K0 of reported elements;
  the amplitude quantization accuracy;
  the phase quantization accuracy;
  the number of different accuracies for amplitude quantization; or
  the number of accuracies for phase quantization.

One or more reporting parameters in the above reporting parameters may be combined.

The solution will be described below in detail through multiple scenarios.

A first scenario: the reporting parameter is determined according to a reporting layer of the terminal device, and the terminal calculates an RI.

The reporting parameter is determined based on different layers and/or a higher-layer indication.

$W = W_1 \hat{W}_2 W_f^H$ of each layer is calculated. For at least one layer of a same terminal device, a same configuration, for example, a present design such as rank=2, may be used, and of course, different configurations may also be used.

Specifically, for different layers, same or different L may be configured according to the indication information of the network device.

For different layers, same or different M may be obtained according to at least one parameter in the indication information. The at least one parameter may be N3, different p, and/or different R.

Specifically, a manner for calculating an M value of each layer is, for example:

$$M_i = \left\lceil p_i \times \frac{N_3}{R_i} \right\rceil \text{ or } M_i = \lceil p_i \times N_3 \rceil$$

Herein, i represents different layers of the terminal device. For example, when the terminal device has two layers, i is 1 and 2 respectively, namely M values of layer 1 and layer 2 are calculated respectively.

For different layers, K0 may be the same or different according to the configuration. A calculation manner may be:

$K_{0,i} = \lceil \beta_i \times 2L_i M_i \rceil$, where i corresponds to different layers.

Furthermore, for different layers, the same or different amplitude and phase quantization accuracies may be used according to the indication information.

Coded channel information of at least one layer for codebook calculation may be determined based on the at least one reporting parameter, and the coded channel information of the at least one layer for codebook calculation may be sent to the network device.

That is, the terminal device may encode and report W of each layer in a preset order, and a network side may obtain channel information of each layer in the preset order. The preset order may be from higher layers to lower layers, or from the lower layers to the higher layers.

For reporting of $\hat{W}_2$, the network device may configure an L value, i.e., the number of the spatial bases. For Rel-15, L is a constant configured by RRC, and a value range is {2,3,4}. For Rel-16 MIMO enhancement under discussion, the value of L is undetermined to be {2,4} or {3,6}.

An M value (related to a reported frequency-domain bandwidth), i.e., the number of reported frequency bases, is used, and is configured by a higher layer. N3 is the number of candidate frequency bases. R is 1 or 2, and is a parameter configured by the higher layer.

A K0 value is used to restrict the maximum number of the reported elements in $\hat{W}_2$, and is also configured by a higher layer.

The number of non-zero elements in $\hat{W}_2$ and/or positions in $\hat{W}_2$ may be determined based on a bitmap and/or an indication.

The quantization accuracy in $\hat{W}_2$ may be determined based on one or more sets of (amplitude, phase) parameters. For example, ¾ bit may be used for amplitude quantization, and ¾ bit may be used for phase quantization.

For part of elements (for example, first 50%) corresponding to a higher amplitude, 4 bit may be used for amplitude quantization, and 3 bit may be used for phase quantization. For a part corresponding to a lower amplitude, 2 bit may be used for amplitude quantization, and 2 bit may be used for phase quantization.

For a 0th frequency basis, (4, 4)bit may be used for (amplitude, phase) quantization. For another frequency basis, (3, 3)bit may be used for (amplitude, phase) quantization.

Physical meanings of the parameters are as follows:

L indicates a column number of W1, the column number of W1 is 2L in practice, two polarization directions correspond to a same SD basis, and channel information of L SD bases is fed back through a codebook.

M indicates a column number of $W_f^H$, the M columns are selected from totally N3 FD bases, and channel information of the M FD bases are fed back through a codebook.

K0 indicates the maximum number of non-zero elements in $\hat{W}_2$, and an (i,j)th element in $\hat{W}_2$ describes a weighting coefficient of an ith SD basis and a jth FD basis. (K0 is the maximum number of the non-zero elements, and the number of practically reported non-zero elements may be less than K0).

A second scenario: the reporting parameter is determined based on a rank index of the terminal device, and the terminal calculates the RI.

It is to be understood that the first and second scenarios may be combined.

Different reporting parameters may be determined for different rank indexes and/or a higher-layer indication.

$W = W_1 \hat{W}_2 W_f^H$ of each layer is calculated based on the indication information.

For different rank indexes, L may be the same or different according to the configuration.

For different rank indexes, M may be the same or different. Different M may be determined by N3 and different p and/or R in the indication information. For example:

$$M_i = \left\lceil p_i \times \frac{N_3}{R_i} \right\rceil \text{ or } M_i = \lceil p_i \times N_3 \rceil$$

Herein, i corresponds to different rank indexes.

For different layers, K0 may be the same or different according to the configuration.

$$K_{0,i} = \lceil \beta_i \times 2L_i M_i \rceil$$

Herein, i corresponds to different rank indexes.

For different rank indexes, the same or different amplitude and phase quantization accuracies may be used according to the configuration.

Similarly, the abovementioned calculations may be combined to finally acquire at least one of the parameters.

The terminal device may code and report W of each layer in a preset order, and the network side may obtain channel information of each layer in the preset order.

A third scenario: the reporting parameter is determined by the CSI measurement bandwidth reported by the terminal device.

At first, the terminal device reports its own CSI measurement bandwidth to the network device. The network device determines corresponding indication information according to the capability of the terminal device. Furthermore, the terminal device determines the reporting parameter according to the indication information.

$W = W_1 \hat{W}_2 W_f^H$ of each layer is calculated.

For different reported CSI measurement bandwidths, L may be the same or different according to the configuration.

For different reported CSI measurement bandwidths, M may be the same or different according to the configuration. Different M may be determined by N3 and different p and/or R. For example:

$$M_i = \left\lceil p_i \times \frac{N_3}{R} \right\rceil \text{ or } M_i = \lceil p_i \times N_3 \rceil$$

Herein, i corresponds to different reported CSI measurement bandwidths, namely i=0 when N3/R<T, and i=1 when N3/R>=T (or i=0 when N3<T, and i=1 when N3>=T).

For different reported CSI measurement bandwidths, K0 may be the same or different according to the configuration.

$$K_{0,i} = \lceil \beta_i \times 2L_i M_i \rceil$$

Herein, i corresponds to different reported CSI measurement bandwidths, namely i=0 when N3/R<T, and i=1 when N3/R>=T (or i=0 when N3<T, and i=1 when N3>=T).

For different reported CSI measurement bandwidths, same or different amplitude and phase quantization accuracies may be used according to the configuration.

The terminal device may encode and report W of each layer in a preset order, and the network side may obtain channel information of each layer in the preset order.

A fourth scenario: the reporting parameter is determined by a UE capability.

The reporting parameter is determined according to a UE capability indication.

$W = W_1 \hat{W}_2 W_f^H$ of each layer is calculated.

For different UE capability indications, L may be same or different according to the configuration.

For different UE capability indications, M may be the same or different according to the configuration. Different M may be determined by N3 and different p and/or R. For example:

$$M_i = \left\lceil p_i \times \frac{N_3}{R_i} \right\rceil \text{ or } M_i = \lceil p_i \times N_3 \rceil$$

Herein, i corresponds to different UE capability indications.

For different layers, K0 may be the same or different according to the configuration.

$$K_{0,i} = \lceil \beta_i \times 2L_i M_i \rceil$$

Herein, i corresponds to different UE capability indications.

For different UE capability indications, the same or different amplitude and phase quantization accuracies may be used according to the configuration.

The abovementioned calculations may be freely combined.

The terminal may encode and report W of each layer in a preset order, and the network side obtains channel information of each layer in the preset order.

It can be seen that, with adoption of the solutions, a corresponding parameter may be configured for the terminal device according to related information of the terminal device, and furthermore, the terminal device may determine and send, to the network device, channel information of at least one layer. The related information may include information of at least one layer. In such a manner, a codebook may be extended to a higher rank based on a condition of the terminal device, moreover, different terminal devices may correspond to different indication information, so that the accuracy of channel information determined by different terminal devices according to their own conditions is improved. Moreover, related information of different terminal devices is combined, so that the condition that a terminal device without a corresponding capability corresponds to a higher-rank reporting parameter may be avoided, and the robustness and easiness for implementation of a system are improved.

Embodiment 4

Figure 5:
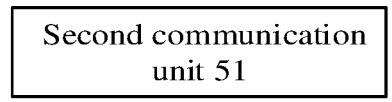
FIG. 5 is a composition structure diagram of a terminal device according to an embodiment of the disclosure.

The embodiment of the disclosure provides a terminal device, which, as shown in FIG. 5, includes a second communication unit 51.

The second communication unit 51 is configured to receive a reporting parameter configured by a network device, the reporting parameter being configured in a manner that different terminal devices may correspond to different reporting parameters, the terminal device corresponding to different reporting parameters under different conditions, and the reporting parameter including at least one of following information: the number of spatial bases, the number of frequency bases, or a maximum number of non-zero elements.

The second communication unit 51 is configured to send UE capability information to the network device.

The reporting parameter may include at least one of following information:
  the number of spatial bases corresponding to each layer;
  the number of spatial bases corresponding to a rank index;
  the number of spatial bases corresponding to a CSI measurement bandwidth reported by the terminal device;
  the number of spatial bases corresponding to a capability of the terminal device;
  at least one parameter for determining the number of frequency-domain bases corresponding to each layer;
  at least one parameter for determining the number of frequency-domain bases corresponding to the rank index;
  at least one parameter for determining the maximum number of non-zero elements corresponding to each layer; or
  at least one parameter for determining the maximum number of non-zero elements corresponding to the rank index.

Specifically, according to the solution provided in the embodiment, related parameters of multiple groups of terminal devices may be defined, and indication information is sent to the terminal devices based on at least one of different capabilities, different rank indexes, different layers, or different reporting bandwidths, the indication information including at least one type of information, so that the terminal devices can determine the corresponding parameters according to the indication information for channel information reporting.

The reporting parameter may further include at least one of following information:
  an amplitude quantization accuracy and/or phase quantization accuracy corresponding to each layer;
  an amplitude quantization accuracy and/or phase quantization accuracy corresponding to a rank index;
  an amplitude quantization accuracy and/or phase quantization accuracy corresponding to a CSI measurement bandwidth of the terminal device; or
  an amplitude quantization accuracy and/or phase quantization accuracy corresponding to a capability of the terminal device.

That is, the reporting parameter may specifically include at least one of following information:
  the number L of spatial bases;
  the number M of frequency bases;
  the maximum number K0 of reported elements;
  the amplitude quantization accuracy;
  the phase quantization accuracy;
  the number of different accuracies for amplitude quantization; or
  the number of accuracies for phase quantization.

One or more reporting parameters in the above reporting parameters may be combined.

It is to be understood that at least one parameter in the abovementioned indication information may be determined by the network device based on a layer and/or rank index of the terminal device. The terminal device uses different parameters for reporting in case of different layer indexes. Use of different parameters have two meanings: one is that different parameter sets are used for different layers in the same terminal device; and another is that different terminal devices correspond to different rank indexes (RIs), and thus different terminal devices may use different parameter sets.

The reporting parameter may be determined by a bandwidth of the terminal device. For example, the reporting parameter may be determined according to a threshold. For example, when the number of CSI reporting sub-bands of the terminal device is less than a bandwidth threshold, a first parameter is used, otherwise a second parameter is used.

The reporting parameter may be determined by a UE capability. The terminal device may report a capability indication to network, and the network may configure, through the indication information, the terminal device to use a corresponding parameter. It is to be pointed out that the abovementioned parameter may be one parameter, or a parameter set consisting of multiple parameters.

The second communication unit 51 is configured to encode and report channel information of each layer based on the reporting parameter.

The solution will be described below in detail through multiple scenarios.

A first scenario: the reporting parameter is determined based on a layer of the terminal device for reporting, and the terminal calculates an RI.

The reporting parameter is determined based on different layers and/or a higher-layer indication.

$W=W_1 \hat{W}_2 W_f^H$ of each layer is calculated. For at least one layer of the terminal device, the same configuration, for example, a present design such as rank=2, may be used, and of course, different configurations may also be used.

Specifically, for different layers, the same or different L may be configured according to the indication information of the network device.

For different layers, the same or different M may be obtained according to at least one parameter in the indication information. The at least one parameter may be N3, different p, and/or different R.

Specifically, a manner for calculating an M value of each layer is, for example:

$$M_i = \left\lceil p_i \times \frac{N_3}{R_i} \right\rceil \text{ or } M_i = \lceil p_i \times N_3 \rceil.$$

Herein, i represents different layers of the terminal device. For example, when the terminal device has two layers, i is 1 and 2 respectively, namely M values of layer 1 and layer 2 are calculated respectively.

For different layers, K0 may be the same or different according to the configuration. A calculation manner may be:

$K_{0,i} = \lceil \beta_i \times 2L_i M_i \rceil$, where i corresponds to different layers.

Furthermore, for different layers, the same or different amplitude and phase quantization accuracies may be used according to the indication information.

Coded channel information of at least one layer for codebook calculation may be determined based on the at least one reporting parameter, and the coded channel information of the at least one layer for codebook calculation may be sent to the network device.

That is, the terminal device may encode and report W of each layer in a preset order, and a network side may obtain channel information of each layer in the preset order. The preset order may be from higher layers to lower layers, or from the lower layers to the higher layers.

For reporting of $\hat{W}_2$, the network device may configure an L value, i.e., the number of the spatial bases. For Rel-15, L is a constant configured by RRC, and a value range is {2,3,4}. For Rel-16 MIMO enhancement under discussion, the value of L is undetermined to be {2,4} or {3,6}.

An M value (related to a reported frequency-domain bandwidth), i.e., the number of reported frequency bases, is used, and is configured by a higher layer. N3 is the number of candidate frequency bases. R is 1 or 2, and is a parameter configured by a higher layer.

A K0 value is used to restrict the maximum number of the reported elements in and is also configured by a higher layer.

The number of non-zero elements in $\hat{W}_2$ and/or positions in $\hat{W}_2$ may be determined through a bitmap and/or an indication.

The quantization accuracy in $\hat{W}_2$ may be determined through one or more sets of (amplitude, phase) parameters. For example, ¾ bit may be used for amplitude quantization, and ¾ bit may be used for phase quantization.

For part of elements (for example, first 50%) corresponding to a higher amplitude, 4 bit may be used for amplitude quantization, and 3 bit may be used for phase quantization. For a part corresponding to a relatively low amplitude, 2 bit may be used for amplitude quantization, and 2 bit may be used for phase quantization.

For a 0th frequency basis, (4, 4)bit may be used for (amplitude, phase) quantization. For another frequency basis, (3, 3)bit may be used for (amplitude, phase) quantization.

Physical meanings of the parameters are as follows.

L indicates a column number of W1, a column number of W1 may be 2L in practice, two polarization directions correspond to the same SD basis, and channel information of L SD bases may be fed back through a codebook.

M indicates a column number of $W_f^H$, the M columns may be selected from totally N3 FD bases, and channel information of the M FD bases may be fed back through a codebook.

K0 indicates the maximum number of the non-zero elements in $\hat{W}_2$, and an (i,j)th element in $\hat{W}_2$ describes a weighting coefficient of an ith SD basis and a jth FD basis. (K0 is the maximum number of the non-zero elements, and the number of practically reported non-zero elements may be less than K0).

A second scenario: the reporting parameter is determined according to a rank index of the terminal device, and the terminal calculates the RI.

It is to be understood that the first and second scenarios may be combined.

Different reporting parameters may be determined for different rank indexes and/or a higher-layer indication.

$W=W_1 \hat{W}_2 W_f^H$ of each layer is calculated based on the indication information.

For different rank indexes, L may be the same or different according to the configuration.

For different rank indexes, M may be the same or different. Different M may be determined by N3 and different p and/or R in the indication information. For example:

$$M_i = \left\lceil p_i \times \frac{N_3}{R_i} \right\rceil \text{ or } M_i = \lceil p_i \times N_3 \rceil$$

Herein, i corresponds to different rank indexes.

For different layers, K0 may be the same or different according to the configuration.

$K_{0,i} = \lceil \beta_i \times 2L_i M_i \rceil$

Herein, i corresponds to different rank indexes.

For different layer indexes, the same or different amplitude and phase quantization accuracies may be used according to the configuration.

Similarly, the abovementioned calculations may be combined to finally acquire at least one of the parameters.

The terminal may encode and report W of each layer in a preset order, and the network side obtains channel information of each layer in the preset order.

A third scenario: the reporting parameter is determined by a CSI measurement bandwidth reported by the terminal device.

At first, the terminal device reports its own CSI measurement bandwidth to the network device. The network device determines corresponding indication information according to the capability of the terminal device. Furthermore, the terminal device determines a reporting parameter according to the indication information.

$W=W_1\hat{W}_2W_f^H$ of each layer is calculated.

For different reported CSI measurement bandwidths, L may be the same or different according to the configuration.

For different reported CSI measurement bandwidths, M may be the same or different according to the configuration. Different M may be determined by N3 and different p and/or R. For example:

$$M_i = \left\lfloor p_i \times \frac{N_3}{R} \right\rfloor \text{ or } M_i = \lceil p_i \times N_3 \rceil$$

Herein, i corresponds to different reported CSI measurement bandwidths, namely i=0 when N3/R<T, and i=1 when N3/R>=T (or i=0 when N3<T, and i=1 when N3>=T).

For different reported CSI measurement bandwidths, K0 may be the same or different according to the configuration.

$K_{0,i} = \lceil \beta_i \times 2L_i M_i \rceil$

Herein, i corresponds to different reported CSI measurement bandwidths, namely i=0 when N3/R<T, and i=1 when N3/R>=T (or i=0 when N3<T, and i=1 when N3>=T).

For different reported CSI measurement bandwidths, the same or different amplitude and phase quantization accuracies may be used according to the configuration.

The terminal device codes and reports W of each layer in a preset order, and the network side obtains channel information of each layer in the preset order.

A fourth scenario: the reporting parameter is determined by a UE capability.

The reporting parameter is determined according to a UE capability indication.

$W=W_1\hat{W}_2W_f^H$ of each layer is calculated.

For different UE capability indications, L may be the same or different according to the configuration.

For different UE capability indications, M may be the same or different according to the configuration. Different M may be determined by N3 and different p and/or R. For example:

$$M_i = \left\lfloor p_i \times \frac{N_3}{R_i} \right\rfloor \text{ or } M_i = \lceil p_i \times N_3 \rceil$$

Herein, i corresponds to different UE capability indications.

For different layers, the same or different K0 may be obtained according to the configuration.

$K_{0,i} = \lceil \beta_i \times 2L_i M_i \rceil$

Herein, i corresponds to different UE capability indications.

For different UE capability indications, the same or different amplitude and phase quantization accuracies may be used according to the configuration.

The abovementioned calculations may be freely combined.

The terminal codes and reports W of each layer in a preset order, and the network side obtains channel information of each layer in the preset order.

It can be seen that, with adoption of the solutions, a corresponding parameter may be configured for the terminal device according to related information of the terminal device, and furthermore, the terminal device may determine and send, to the network device, channel information of at least one layer. The related information may include information of at least one layer. In such a manner, a codebook may be extended to a higher rank based on a condition of the terminal device, and moreover, different terminal devices may correspond to different indication information, so that the accuracy of channel information determined by different terminal devices according to their own conditions is improved. Moreover, related information of different terminal devices is combined, so that the condition that a terminal device without a corresponding capability corresponds to a higher-rank reporting parameter may be avoided, and the robustness and easiness for implementation of a system are improved.

Figure 6:
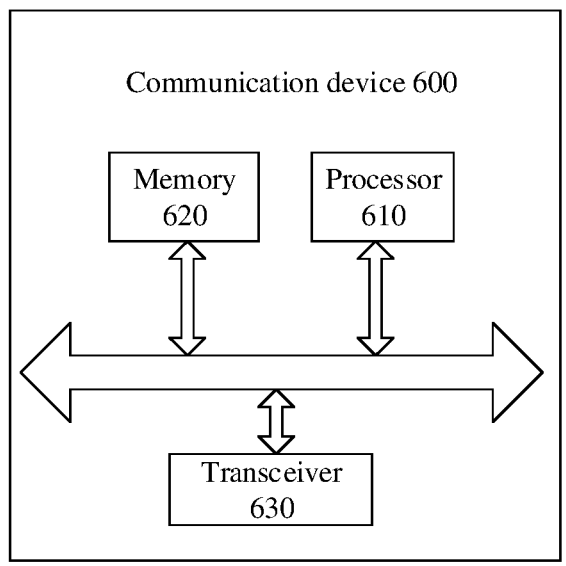
FIG. 6 is a composition structure diagram of a communication device according to an embodiment of the disclosure.

FIG. 6 is a schematic structure diagram of a communication device 600 according to an embodiment of the disclosure. The communication device may be the abovementioned terminal device or network device in the embodiments. The communication device 600 shown in FIG. 6 includes a processor 610, and the processor 610 may call and run a computer program in a memory to implement the method in the embodiments of the disclosure.

Optionally, as shown in FIG. 6, the communication device 600 may further include memory 620. The processor 610 may call and run the computer program in the memory 620 to implement the method in the embodiments of the disclosure.

The memory 620 may be an independent device independent of the processor 610 or may also be integrated into the processor 610.

Optionally, as shown in FIG. 6, the communication device 600 may further include a transceiver 630. The processor 610 may control the transceiver 630 to communicate with another device, specifically sending information or data to another device or receiving information or data from another device.

The transceiver 630 may include a transmitter and a receiver. The transceiver 630 may further include antennae, and the number of the antennae may be one or more.

Optionally, the communication device 600 may specifically be the network device in the above embodiments of the disclosure. The communication device 600 may implement corresponding flows implemented by the network device in each method of the embodiments of the disclosure. For simplicity, elaborations are omitted herein.

Optionally, the communication device 600 may specifically be a terminal device or network device of the embodiment of the disclosure. The communication device 600 may implement corresponding flows implemented by a mobile terminal/terminal device in each method of the embodiments of the disclosure. For simplicity, elaborations are omitted herein.

Figure 7:
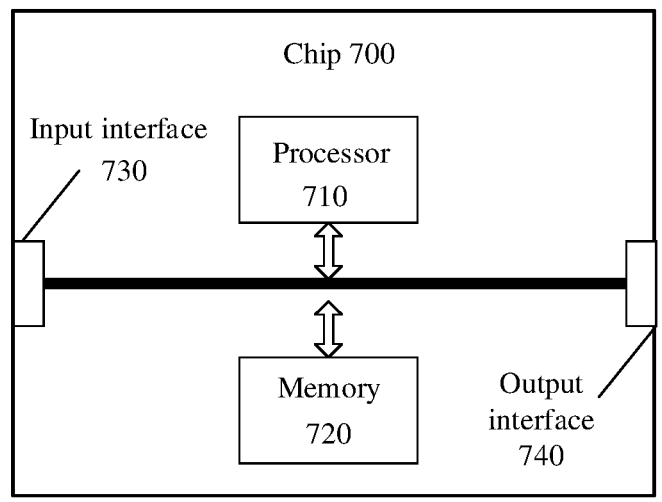
FIG. 7 is a schematic block diagram of a chip according to an embodiment of the disclosure.

FIG. 7 is a schematic structure diagram of a chip according to another embodiment of the disclosure. The chip 700 shown in FIG. 10 includes a processor 710, and the processor 710 may call and run a computer program in a memory to implement the method in the embodiments of the disclosure.

Optionally, as shown in FIG. 7, the chip 700 may further include the memory 720. The processor 710 may call and run the computer program in the memory 720 to implement the method in the embodiments of the disclosure.

The memory 720 may be an independent device independent of the processor 710 and may also be integrated into the processor 710.

Optionally, the chip 700 may further include an input interface 730. The processor 710 may control the input interface 730 to communicate with another device or chip, specifically acquiring information or data sent by another device or chip.

Optionally, the chip 700 may further include an output interface 740. The processor 710 may control the output interface 740 to communicate with another device or chip, specifically outputting information or data sent by another device or chip.

Optionally, the chip may be applied to the network device of the embodiments of the disclosure, and the chip may implement corresponding flows implemented by the network device in each method of the embodiments of the disclosure. For simplicity, elaborations are omitted herein.

Optionally, the chip may be applied to the terminal device of the embodiments of the disclosure, and the chip may implement corresponding flows implemented by the terminal device in each method of the embodiments of the disclosure. For simplicity, elaborations are omitted herein.

It is to be understood that the chip mentioned in the embodiment of the disclosure may also be called a system-level chip, a system chip, a chip system or a system on chip, etc.

Figure 8:
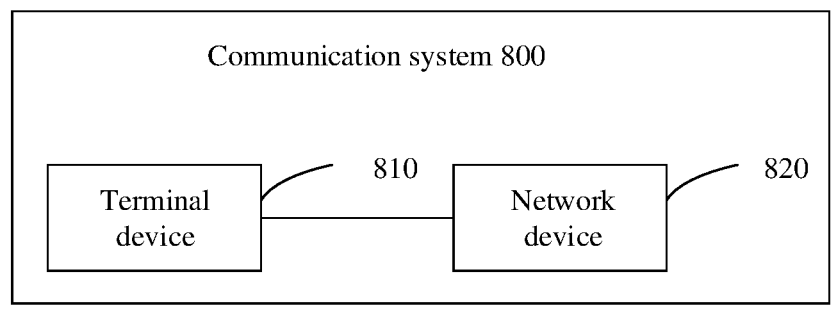
FIG. 8 is a second schematic diagram of an architecture of a communication system according to an embodiment of the disclosure.

FIG. 8 is a second block diagram of a communication system 800 according to an embodiment of the disclosure. As shown in FIG. 11, a communication system 800 includes a terminal device 810 and a network device 820.

The terminal device 810 may be configured to realize corresponding functions realized by the terminal device in the method, and the network device 820 may be configured to realize corresponding functions realized by the network device in the method. For simplicity, elaborations are omitted herein.

It is to be understood that the processor in the embodiment of the disclosure may be an integrated circuit chip and has a signal processing capacity. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component.

It can be understood that the memory in the embodiment of the disclosure may be a volatile memory or a nonvolatile memory, or may include both the volatile and nonvolatile memories. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), and is used as an external high-speed cache.

It is to be understood that the memory is exemplarily but unlimitedly described. For example, the memory in the embodiments of the disclosure may also be a Static RAM (SRAM), a Dynamic RAM (DRAM), a Synchronous DRAM (SDRAM), a Double Data Rate (DDR) SDRAM, an Enhanced SDRAM (ESDRAM), a Synch Link DRAM (SLDRAM), and a Direct Rambus RAM (DR RAM). That is, the memory in the embodiments of the disclosure is intended to include, but not limited to, memories of these and any other proper types.

The embodiments of the disclosure also provide a computer-readable storage medium, which is configured to store a computer program.

Optionally, the computer-readable storage medium may be applied to a network device in the embodiments of the disclosure, and the computer program causes a computer to execute corresponding flows implemented by the network device in each method of the embodiments of the disclosure. For simplicity, elaborations are omitted herein.

Optionally, the computer-readable storage medium may be applied to a mobile terminal/terminal device in the embodiments of the disclosure, and the computer program causes a computer to execute corresponding flows implemented by the terminal device in each method of the embodiments of the disclosure. For simplicity, elaborations are omitted herein.

The embodiments of the disclosure also provide a computer program product, which includes a computer program instruction.

Optionally, the computer program product may be applied to a network device in the embodiments of the disclosure, and the computer program instruction causes a computer to execute corresponding flows implemented by the network device in each method of the embodiments of the disclosure. For simplicity, elaborations are omitted herein.

The embodiments of the disclosure also provide a computer program.

Optionally, the computer program may be applied to a network device in the embodiments of the disclosure, and the computer program runs in a computer to cause the computer to execute corresponding flows implemented by the network device in each method of the embodiments of the disclosure. For simplicity, elaborations are omitted herein.

Optionally, the computer program may be applied to a mobile terminal/terminal device in the embodiments of the disclosure, and the computer program runs in the computer to cause the computer to execute corresponding flows implemented by the mobile terminal/terminal device in each method of the embodiments of the disclosure. For simplicity, elaborations are omitted herein.

The invention claimed is:

1. A method for processing codebook information, applied to a network device and comprising:
  determining, based on a rank index of each of at least one terminal device, a reporting parameter for each respective one of the at least one terminal device, wherein different terminal devices with different User Equipment (UE) capability information correspond to different reporting parameters, the reporting parameter comprises the number of spatial basis vectors and the number of frequency basis vectors, and a same terminal device corresponds to different numbers of frequency basis vectors under different rank indexes; and
  configuring the reporting parameter respectively for each of the at least one terminal device and allocating the reporting parameter to a corresponding terminal device respectively.

2. The method of claim 1, before determining, based on the rank index of each of at least one terminal device, the reporting parameter for each respective one of the at least one terminal device, the method further comprising:
  receiving the different UE capability information from the different terminal devices.

3. The method of claim 2, wherein the method further comprises:
  determining the different reporting parameters for the different terminal devices based on the different UE capability information.

4. A method for processing codebook information, applied to a terminal device and comprising:
receiving a reporting parameter from a network device, wherein the reporting parameter is determined by the network device based on a rank index of the terminal device, and is configured in a manner that different terminal devices with different User Equipment (UE) capability information correspond to different reporting parameters, the reporting parameter comprises the number of spatial basis vectors, and the number of frequency basis vectors, and the terminal device corresponds to different numbers of frequency basis vectors under different rank indexes.

5. The method of claim 4, before receiving the reporting parameter the network device, the method further comprising:
sending UE capability information to the network device.

6. The method of claim 4, wherein the reporting parameter further comprises at least one of following information:
the number of spatial basis vectors corresponding to each layer;
the number of spatial basis vectors corresponding to a rank index;
the number of spatial basis vectors corresponding to a Channel State Information (CSI) measurement reporting bandwidth of the terminal device;
the number of spatial basis vectors corresponding to a capability of the terminal device;
at least one parameter for determining the number of frequency-domain basis vectors corresponding to each layer;
at least one parameter for determining the number of frequency-domain basis vectors corresponding to a rank index;
at least one parameter for determining the maximum number of non-zero elements corresponding to each layer; or
at least one parameter for determining the maximum number of non-zero elements corresponding to a rank index.

7. The method of claim 4, wherein receiving the reporting parameter from the network device comprises:
explicitly or implicitly acquiring the reporting parameter configured by the network device.

8. The method of claim 4, after receiving the reporting parameter from the network device, the method further comprising:
encoding and reporting channel information of each layer based on the reporting parameter.

9. A network device, comprising:
a processor, configured to determine, based on a rank index of each of at least one terminal device, a reporting parameter for each respective one of the at least one terminal device, wherein different terminal devices with different User Equipment (UE) capability information correspond to different reporting parameters, the reporting parameter comprises the number of spatial basis vectors and, the number of frequency basis vectors, and a same terminal device corresponds to different numbers of frequency basis vectors under different rank indexes; and
a transceiver, configured to configure the reporting parameter respectively for each of the at least one terminal device and allocate the reporting parameter to a corresponding terminal device respectively.

10. The network device of claim 9, wherein the transceiver is configured to receive different UE capability information from the different terminal device.

11. The network device of claim 10, wherein the processor is further configured to determine different reporting parameters for different terminal devices based on the different UE capability information.

12. A terminal device, comprising:
a processor;
a memory, storing instructions executable by the processor; and
a transceiver, connected to the processor and the memory, configured to transmit and receive information under control of the processor,
wherein the processor is configured to implement operations of the method of claim 4.

13. The terminal device of claim 12, wherein the transceiver is configured to send User Equipment (UE) capability information to the network device.

14. The terminal device of claim 12, wherein the transceiver is configured to explicitly or implicitly acquire the reporting parameter from the network device.

15. The terminal device of claim 12, wherein the reporting parameter further comprises at least one of following information:
an amplitude quantization accuracy and/or phase quantization accuracy corresponding to each layer;
an amplitude quantization accuracy and/or phase quantization accuracy corresponding to a rank index;
an amplitude quantization accuracy and/or phase quantization accuracy corresponding to a CSI measurement bandwidth of the terminal device; or
an amplitude quantization accuracy and/or phase quantization accuracy corresponding to a capability of the terminal device.

16. The terminal device of claim 12, wherein the transceiver is configured to encode and report channel information of each layer based on the reporting parameter.

17. The method of claim 1, wherein the reporting parameter further comprises at least one of following information:
the number of spatial basis vectors corresponding to each layer;
the number of spatial basis vectors corresponding to a rank index;
the number of spatial basis vectors corresponding to a CSI measurement bandwidth reported by the terminal device;
the number of spatial basis vectors corresponding to a capability of the terminal device;
at least one parameter for determining the number of frequency-domain basis vectors corresponding to each layer;
at least one parameter for determining the number of frequency-domain basis vectors corresponding to a rank index;
at least one parameter for determining the maximum number of non-zero elements corresponding to each layer; or
at least one parameter for determining the maximum number of non-zero elements corresponding to the rank index.

18. The method of claim 17, wherein configuring the reporting parameter respectively for each of the at least one terminal device and allocating the reporting parameter to a corresponding terminal device respectively comprises:
configuring the reporting parameter respectively for each of the at least one terminal device and allocating the reporting parameter explicitly or implicitly to corresponding terminal device respectively.

* * * * *